United States Patent [19]

Layher

[11] 4,180,342
[45] Dec. 25, 1979

[54] ARRANGEMENT FOR CONNECTING STRUCTURAL MEMBERS

[76] Inventor: Eberhard Layher, D-1729 Guglingen-Eibensbach Württ., Fed. Rep. of Germany

[21] Appl. No.: 923,648

[22] Filed: Jul. 11, 1978

[30] Foreign Application Priority Data

Aug. 23, 1977 [DE] Fed. Rep. of Germany ....... 2737859

[51] Int. Cl.$^2$ .......................... E04G 7/00; F16B 7/00
[52] U.S. Cl. ....................................... 403/24; 403/49; 403/246; 182/179; 52/691
[58] Field of Search .................. 403/49, 256, 246, 24; 182/179; 52/691, 721

[56] References Cited

U.S. PATENT DOCUMENTS

| 3,420,557 | 1/1969 | Francis et al. ................. 182/179 X |
| 3,817,641 | 6/1974 | Steele et al. ......................... 403/256 |
| 4,044,523 | 8/1977 | Layher ............................... 403/49 X |
| 4,083,640 | 4/1978 | Lovering ........................... 403/49 X |

FOREIGN PATENT DOCUMENTS 1278243 6/1972 United Kingdom ...................... 403/49

*Primary Examiner*—Andrew V. Kundrat
*Attorney, Agent, or Firm*—Michael J. Striker

[57] ABSTRACT

A first member is provided with an elongated recess which has one open end, and a first throughgoing passage which extends transversely to the elongation of the recess. A second member which is to be connected to the first member is provided with a disc which extends outwardly away from the second member. The disc is adapted to be received in the recess when the second and first members are connected to one another. The disc is provided with a throughgoing passage so arranged as to communicate and bound with the first passage of the first member a throughgoing channel. A wedge-shaped element is closely receivable in the channel so as to arrest the second member on the first member and prevent any movement of these two members relative to one another.

15 Claims, 10 Drawing Figures

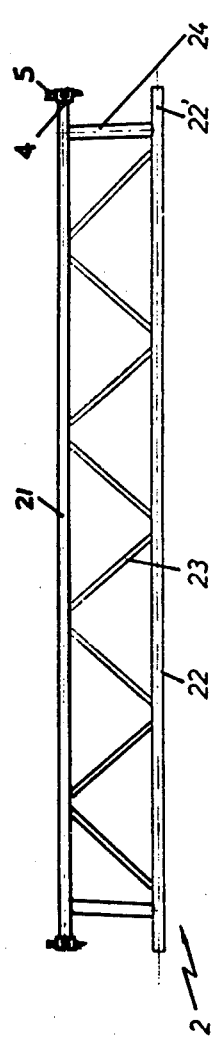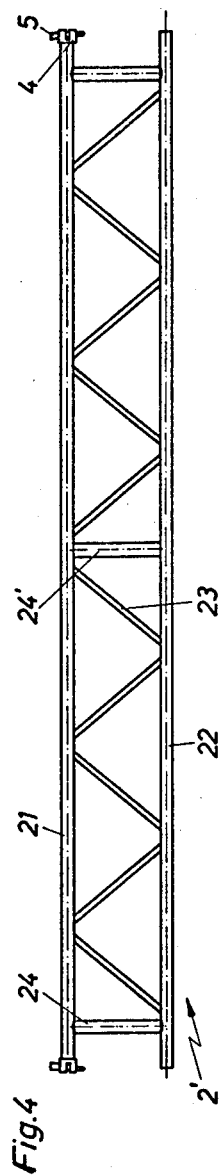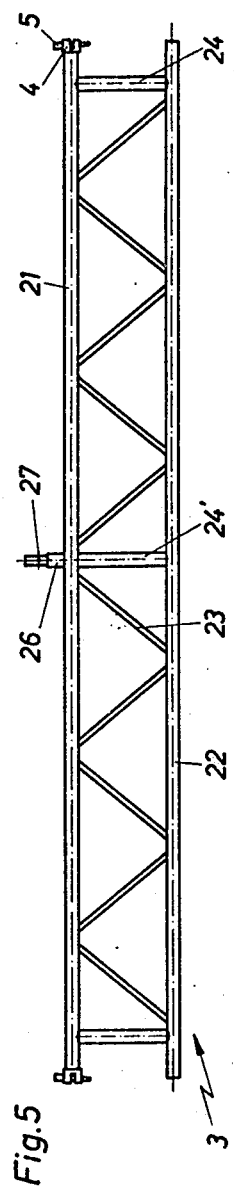

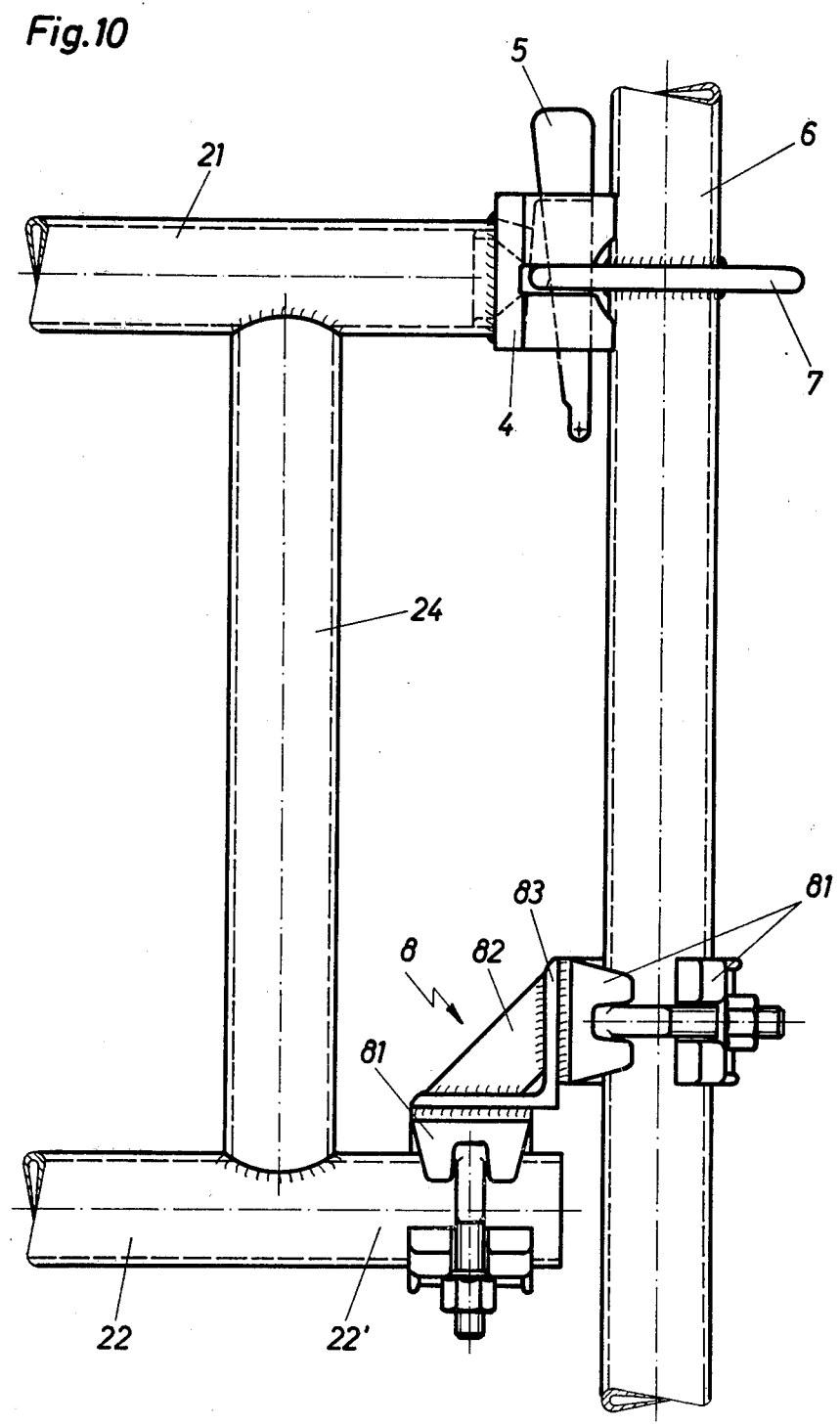

ARRANGEMENT FOR CONNECTING STRUCTURAL MEMBERS

BACKGROUND OF THE INVENTION

The present invention relates to an arrangement for connecting structural members.

More particularly this invention relates to an arrangement for connecting horizontal and vertical members of a structure, such as a scaffold or the like.

It is known in the art that single tubular horizontal members of a frame or scaffold have comparatively low breaking strength, which is especially true in cases of long span-length members. Therefore, it has been suggested to provide the horizontal members of a frame with two tubular elements which are spaced from one another by a certan distance. In this case two elements are connected to each other by intermediate distance members, which extend from one horizontal element to another either normally or diagonally relative to these horizontal elements, thus defining so-called "frame girders" or "braced girders." Such girders can reliably bridge considerable span distances. The upper horizontal element and the middle portion of the lower horizontal element are parallel to each other. The end portions of the lower horizontal element are bent upwardly towards and into engagement with the upper horizontal element. However, it is also possible to arrange the lower horizontal element entirely parallel to the upper horizontal element. It is advantageous to provide the lower horizontal element with the strength equal that of the upper horizontal element, regardless of the fact that the lower element does not have the direct contact with a load applied on such a girder and therefore it may have strength smaller than that of the upper element.

An especially disadvantageous feature of such frame or braced girders resides in the fact that the horizontal elements are connected to corresponding vertical elements by angular-coupling members. Due to such a connection a certain unreliability arises concerning carrying capacity of such a frame. The clamping effect of such a coupling member depends primarily on reliability of the screw connection of the coupling member to the horizontal and vertical elements. Furthermore, the angular-coupling member is a relatively complicated device, because a carrier of such a coupling member has to be located laterally and eccentrically on both horizontal and vertical members. Therefore, a location of the coupling member on the horizontal and vertical elements has to be measured and designated before installing the coupling member. Obviously, such a preliminary measure is a relatively time-consuming operation.

SUMMARY OF THE INVENTION

It is a general object of the present invention to avoid the disadvantages of the prior art arrangements for connecting structural members.

More particularly, it is an object of the present invention to provide such an arrangement for connecting members of a frame or scaffold, which will render it possible to accomplish the connecting operations very quickly and yet which will ensure the reliability of such a connection.

In the pursuance of these objects and others which will become apparent hereafter, one feature of the present invention resides in providing an arrangmenet for detachably connecting members of a frame, which arrangement comprises a first elongated member having two end portions, at least one of said end portions is provided with an elongated recess which has one open end and a first throughgoing passage which extends substantially transversely to the elongation of the recess. A second elongated member is provided to be connected with the first elongated member. The second elongated member is further provided with a third elongated member, for example a disc, which is fixedly mounted on said second member, and extends outwardly away from the second member. The disc is adapted to be received in the recess when the first and second members are connected to each other.

The disc is further provided with at least one second throughgoing passage so arranged on the disc as to communicate and bound with the first passage an uninterrupted channel. The channel is operative to closely receive a fourth member, for example a wedge, so as to arrest said second member on said first member to thereby prevent any movement of said first and second members relative to one another.

Due to such a connection any preliminary measures become unnecessary. Moreover, it becomes also unnecessary to use any screws to connect the first member, for example a horizontal element, to the second member, for example a vertical element. Instead, the wedge which is closely received in the channel defined by the first passage of the horizontal element and the second passage of the disc, will reliably arrest the vertical element on the horizontal element, so as to entirely eliminate all possible movements of the horizontal and vertical elements relative to one another. It is to be understood that installation of such a connection is considerably less timeconsuming as compared to that of the known angular coupling connections.

Further, such a connection is more reliable because upon inserting the wedge in the channel the end face of the horizontal element is forcibly urged against the outer surface of the disc which is rigidly mounted on the vertical element, thus defining a rigid connection between the horizontal and vertical elements.

Such a wedge-type connection provides two and a half connecting surface more than a standard screw- or clamp coupling. It is further advantageous to undetachably insert the wedge into the channel, thereby further increase the reliability of such a connection.

The girders can be of different configurations; thus, as already mentioned, the lower member may have the end portions bent so that they are inclined normally or at an angle towards and engage the corresponding end portions of the upper member. The upper member can be provided at both of its ends with an intermediate support which is provided with the above mentioned first passage and recess.

However, if the lower member extends entirely parallel to the upper member, then the end portions of the lower member can be provided with the known angular-coupling member to thereby be connected to the vertical member of the girder. If this is the case, it is not necessary to carry out any preliminary measures in order to arrange the angular-coupling member, because the arrangement of the upper member relative to the vertical member and the distance between the upper and lower members unmistakably define the right position of the lower member relative to the vertical member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a lateral view of a third embodiment of the frame;

FIG. 4 is a lateral view of a fourth embodiment of the frame;

FIG. 5 is a lateral view of a fifth embodiment of the frame;

FIG. 10 is a lateral view of an arrangement for connecting the vertical and horizontal members of the frame shown in FIG. 2.

DESCRIPTION OF THE PREFERRED EMBODIMENTS

Figure 1:
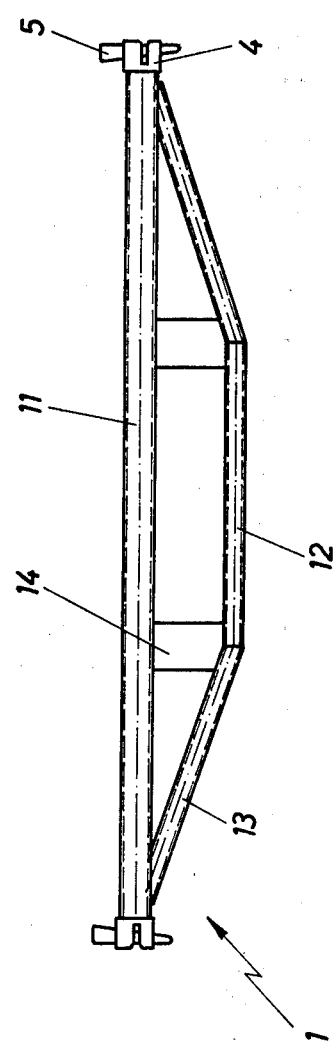
FIG. 1 is a lateral view of a frame in accordance with the present invention.

Referring now to the drawings and first to FIG. 1, it may be seen that the reference numeral 11 designates an upper horizontal tubular member of a frame or a scaffold 1. A lower tubular member of the frame 1 has a central horizontal portion 12 parallel to the upper member 11. The end portions 13 of the lower member are bent upwardly towards the upper member 11. The end portions 13 are fixedly connected (i.e., welded) to the corresponding end portions of the upper member 1. The upper and lower members are also connected with one another through a number (i.e., FIG. 1—two) of distance posts 14. The posts 14 can be, for example, of a flat material. They can be so arranged that their central axes extend normally relative to the longitudinal axis of the upper member 11. Each of the ends of the upper member 11 is provided with a connecting support 4, which may undetachably receive a wedge 5. The support 4 will later on be disclosed in detail.

Figure 2:
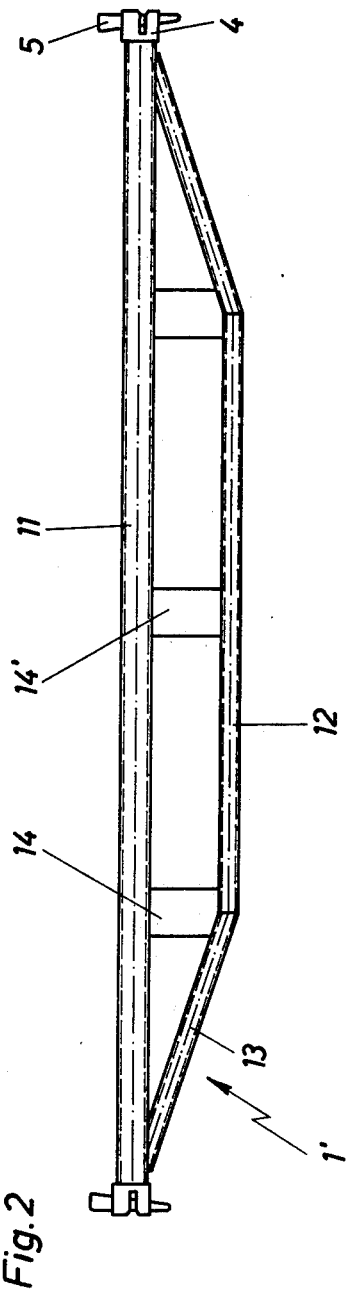
FIG. 2 is a lateral view of another embodiment of the frame in accordance with the present invention.

FIG. 2 shows a frame 1' which is longer than that shown in FIG. 1, due to that the frame 1' is provided with an additional distance post 14'. The other parts of the frame 1' correspond to the frame 1 shown in FIG. 1.

FIG. 3 shows a frame 2, which comprises an upper horizontal tubular member 21 and a lower horizontal tubular member 22 which extend parallel to one another. The lower and upper members are connected to one another by a number of diagonally extended spacing posts 23, which are also operative to reinforce the frame 2. The posts 23 may be made, for example, of metal tubing, or any other profiled material. The corresponding end portions of the upper and lower members 21 and 22 are also connected to each other by spacing posts 24, which have their central axes extending normal relative to the longitudinal axes of the upper and lower members. The posts 24 reinforce the frame 2 even more than the posts 23. Each of the both ends of the upper member 21 is provided with the support 4 for receiving the wedge 5 therein, whereas the both ends of the lower member 22 are free.

If the length of the frame 2' is relatively larger (see for example FIG. 4) than that shown in FIG. 3, then there may be provided an additional perpendicular post 24', which extends parallel to the posts 24. It is to be understood that a frame can be provided with many additional posts 24', depending on the length of the frame. The rest parts of the frame 2' correspond completely to those of the frame 2 shown in FIG. 3.

Another embodiment of the frame is shown in FIG. 5. A frame 3 is provided in the middle of the upper member 21 with a tubular support 26, which extends upwardly and normally relative to the longitudinal axis of the upper member 21. The support 26 is fixedly connected (i.e., welded) to the upper member 21 and is provided with a tubular connecting element 27 extended further upwardly. Such a construction renders it advantageously possible to mount on such a frame another arrangement for similar purpose.

Figure 6:
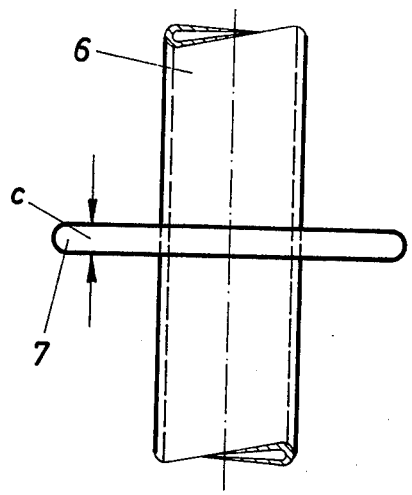
FIG. 6 is a lateral part-view of a vertical member of the frame.
Figure 7:
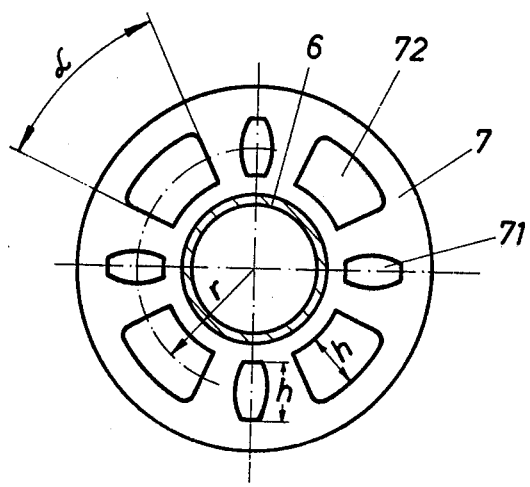
FIG. 7 is a top part view of the vertical member of the frame.

FIGS. 6 and 7 show a vertical tubular member 6 with a disc 7 which is fixedly mounted on the member 6 (i.e., welded). The disc 7 has a width designated by reference C. The disc 7 is also provided with a number of through-going passages 71 and 72. Each of the passages 71 has an axially elongated oval cross-section. Each of the passages 72 is located between two passages 71 and has a cross-section corresponded to an angle $\alpha$ included with the central axis of the tubular member 6. The dimension of each of the passages 71 measured in the radial direction of the disc 7, that is reference h, is equal to that measured in the same direction of the passages 72. The center lines of the passages 71 and 72 drawn in tangential direction relative to the disc 7 are situated on a circle with the radius designated by r. The passages 71 are preferably so arranged on the disc 7, that the central axis of the passages 71 extends normally to the elongation axis of the tubular member 6.

Figure 8:
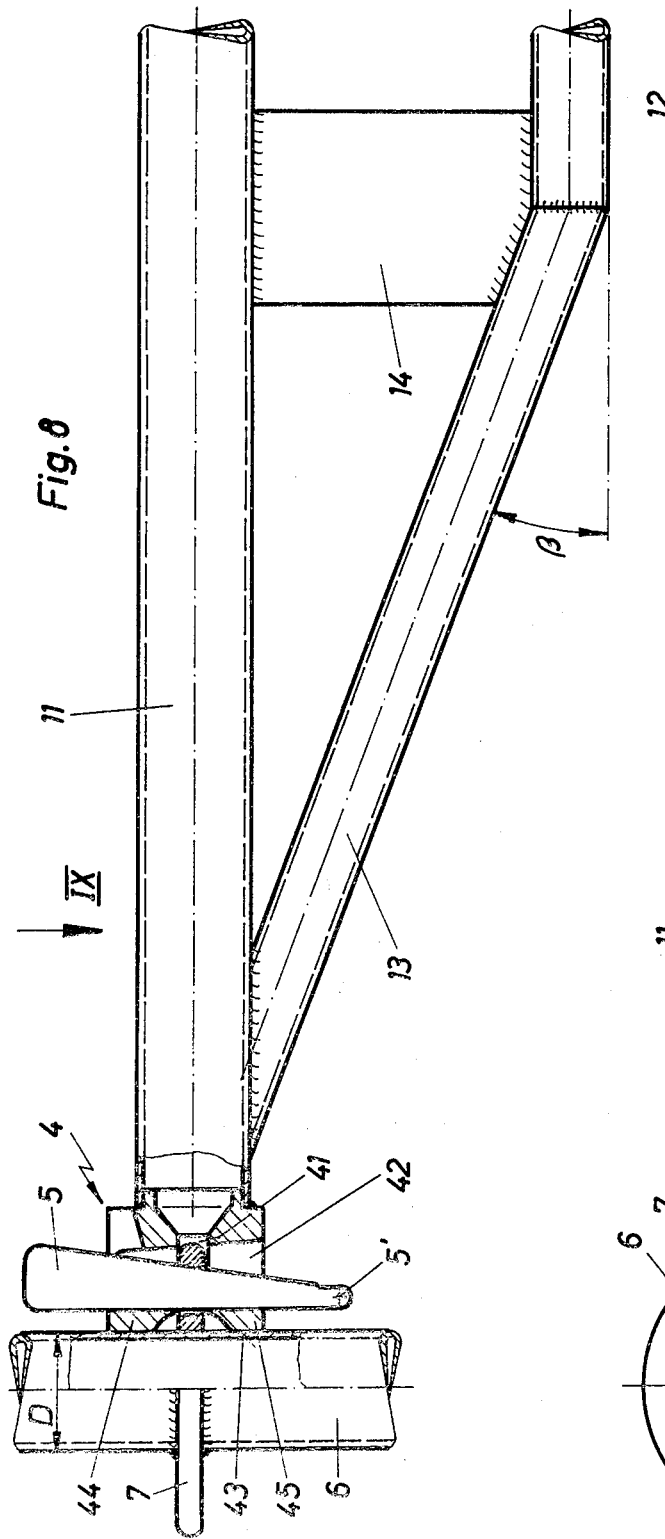
FIG. 8 is a lateral partly sectional view of an arrangement for connecting the vertical and horizontal members of the frame, in accordance with the present invention.
Figure 9:
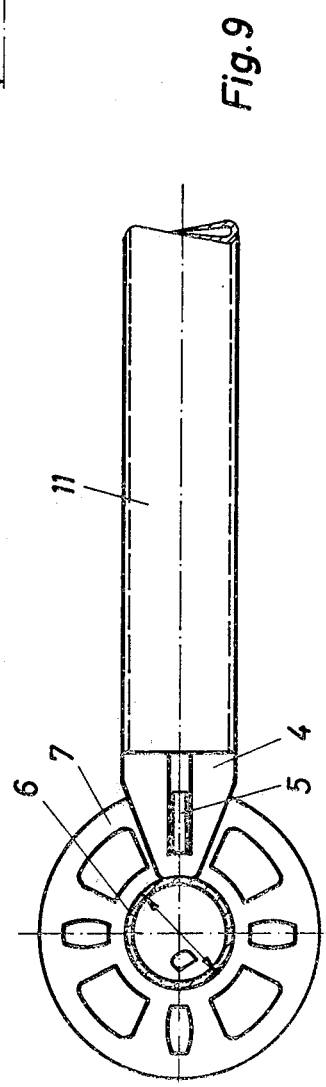
FIG. 9 is a top part-view of the arrangement shown in FIG. 8.

The installation of the arrangement for connecting members of a frame is clearly shown in FIGS. 8 and 9.

The support 4 is provided with an elongated recess 44, which has one open end. The width of the recess 41 is slightly larger than the corresponding width c of the disc 7. The support 4 is further provided with a passage 42 extended on direction substantially transversly (i.e., normally) to the elongation of the recess 41.

The recess 41 is operative to receive a portion of the disc 7 when the vertical member b is connected to the horizontal member 11. When the disc 7 is in the passage 41 the passage 71 of the disc 7 defines with the passage 42 of the support 4 a channel for receiving a wedge 5. The wedge 5 is provided on its relatively small end with a pin 5'. The wall portion 44 of the passage 42 is so arranged as to prevent any rear movement of the wedge 5 with a pin 5' relative to the support 4. It is to be understood that any other different means can be employed to prevent the rear movement of the wedge 5 relative to the support 4, for example, by splitting up the ends of the wedge and expanding the same or by simple twisting the wedge so as to prevent any possible movement of the wedge 5 relative to the support 4.

Thus, the wedge 5 is inserted in the above mentioned channel all the way through until after the wedge 5 can not be moved further through the channel. This position corresponds to a situation where the end face 43 of the support 4 is pressed against the wall of the tubular member 6, so that the vertical tubular member 6 is rigidly connected to the horizontal member 11.

The end portion 13 is inclined upwardly relative to a horizontal line at an angle designated by $\beta$. The outer diameter of the vertical tube 6 is designated by reference $\beta$.

The frames shown in FIGS. 3, 4 and 5 can be connected to corresponding vertical members slightly different from that described hereabove. FIG. 10 shows the type of the arrangement for connecting applicable for above mentioned embodiments.

The support 4 fixedly mounted on the upper member 21 is connected with the disc 7 provided on the vertical member 6, the same way it was shown relative the FIGS. 8 and 9. The lower tubular member 22 extends parallel to the upper member 21, and is connected thereto by the distance post 24. In order to ensure the desirable rigidity of such a frame, a free end 22' of the lower member 22 may also be connected to the vertical member 6 through an angular-coupling member 8. The angular-coupling member 8 can include, for example, two screw-attachments 81, which are rotatably mounted on an angle section 83. The longitudinal axis of each of the attachments 81 extends normally relative to the longitudinal axis of the corresponding tubular member 22' or 6 correspondingly. The angle section 83 is formed of ribs 82 which for purpose of reinforcing the whole structure are welded to each other. The ribs 82 are of flat material.

It will be understood that each of the elements described above, or two or more together, may also find a useful application in other types of an arrangement for connecting members of a frame, differing from the types described above.

While the invention has been illustrated and described as embodied in an arrangement for connecting members of a frame, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for connecting structural members, particularly members of a frame or scaffold, comprising a first elongated member having two end portions, at least one of said end portions being provided with an elongated recess having one open end and a first throughgoing passage extending substantially transversely to the elongation of said recess; a second elongated member to be connected with said first elongated member; a third member fixedly mounted on said second member and extending outwardly away from the second member, said third member being adapted to be received in said recess when said first and second members are connected to each other, said third member being provided with at least one second throughgoing passage so arranged on said third member as to communicate and bound with said first passage an uninterrupted channel; a fourth member closely receivable in said channel so as to arrest said second member on said first member to thereby prevent any movement of said first and second members relative to one another; and a fifth member fixedly spaced from said first member and having first and second portions, an intermediate portion spaced from said first member and extending substantially parallel thereto, said first and second end portions being bent relative to said intermediate portion in direction towards said first member and being rigidly connected thereto.

2. An arrangement as defined in claim 1, wherein said second member extends substantially vertical when the latter is connected to said first member.

3. An arrangement as defined in claim 2, wherein said third member is a disc having a central throughgoing hole operative for closely receiving therein said second vertical member.

4. An arrangement as defined in claim 3, wherein said recess has a predetermined width measured in direction transversely to that of the extension of said recess and slightly exceeding that of said disc.

5. An arrangement as defined in claim 4, wherein said fourth member is a wedge.

6. An arrangement as defined in claim 5, wherein said second throughgoing passage has a cross-section adapted to closely receive said wedge therein upon displacing said wedge through said second passage.

7. An arrangement as defined in claim 6, and further comprising a fifth member fixedly spaced from said first member and extending substantially parallel thereto.

8. An arrangement as defined in claim 1, said first elongated member is provided with an element fixedly mounted on said first member, said element being provided with said first passage and said recess.

9. An arrangement as defined in claim 1, wherein said disc is provided with a first plurality of said second passages uniformly spread one from another by a predetermined distance.

10. An arrangement as defined in claim 9, wherein said disc is further provided with a second plurality of third throughgoing passages uniformly spread on said disc so each said third passage is surrounded by two of said second passages.

11. An arrangement as defined in claim 10, wherein each of said third passages has a cross-section substantially exceeding that of said second passage.

12. An arrangement as defined in claim 7, wherein said fifth member has two end portions at least one of said end portions being fixedly connected to said second member.

13. An arrangement as defined in claim 12, and further comprising detachable means for connecting at least one of said end portions of said fifth member to said second member.

14. An arrangement as defined in claim 13, wherein said connecting means comprise an angular-coupling element fixedly connecting said fifth member to said second member.

15. An arrangement for connecting structural members, particularly frame girders, comprising a plurality of frame girders, each having a first substantially horizontally elongated member, a second elongated member having at least one substantially horizontal portion extending parallel to said first member and a plurality of connecting elements extending angularly between said first and second members and connecting the same so as to constitute together with said first and second members a frame girder, said first member having two end portions and at least one of said end portions being provided with an elongated recess having one open end and a first throughgoing passage extending substantially transversely to the elongation of said recess; a third elongated member to be connected with the frame girder; a fourth member fixedly mounted on said third member and extending outwardly away therefrom, said fourth member being adapted to be received in said recess of said first member when said third member is connected to the frame girder, said fourth member being provided with at least one second throughgoing passage so arranged on said fourth member as to communicate and bound with said first passage an uninterrupted channel; and a fifth member closely receivable in said channel so as to arrest said third member on the frame girder to thereby prevent any movement of the latter and said third member relative to each other.

* * * * *